(12) United States Patent
Lee et al.

(10) Patent No.: US 11,433,774 B2
(45) Date of Patent: Sep. 6, 2022

(54) BATTERY CHARGER FOR ELECTRIC VEHICLE

(71) Applicants: HYUNDAI MOTOR COMPANY, Seoul (KR); KIA MOTORS CORPORATION, Seoul (KR)

(72) Inventors: Woo Young Lee, Yongin-si (KR); Sihun Yang, Hwaseong-si (KR); Jin Myeong Yang, Seongnam-si (KR); Jongpil Kim, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 273 days.

(21) Appl. No.: 16/802,815

(22) Filed: Feb. 27, 2020

(65) Prior Publication Data
US 2021/0101494 A1 Apr. 8, 2021

(30) Foreign Application Priority Data

Oct. 8, 2019 (KR) .......................... 10-2019-0124431

(51) Int. Cl.
*B60L 53/20* (2019.01)
*H02J 7/00* (2006.01)
(Continued)

(52) U.S. Cl.
CPC .............. *B60L 53/20* (2019.02); *B60L 50/60* (2019.02); *B60L 53/60* (2019.02); *H02J 7/007* (2013.01);
(Continued)

(58) Field of Classification Search
CPC ......... B60L 53/20; B60L 50/60; B60L 53/60; H02J 7/00; H02J 7/007; H02P 27/06;
(Continued)

(56) References Cited

U.S. PATENT DOCUMENTS 9,263,968 B2 * 2/2016 Potts .................... H02M 7/4807
9,493,080 B2   11/2016 Kvieska et al.
(Continued)

FOREIGN PATENT DOCUMENTS

DE   102016213061 A1 * 12/2016 .............. B60L 53/24
DE   102017222554 A1    6/2019
WO   WO-2015096224 A1 *  7/2015 ............ B60L 15/007

OTHER PUBLICATIONS

European Search Report for EP Application No. 20160722.3, dated Jul. 10, 2020.

*Primary Examiner* — Richard Isla
*Assistant Examiner* — Dung V Bui
(74) *Attorney, Agent, or Firm* — McDonnell Boehnen Hulbert & Berghoff LLP

(57) ABSTRACT

Disclosed herein is a battery charger for electric vehicle includes a motor configured to generate power for driving the electric vehicle, an inverter configured to provide the power to the motor, an AC power input terminal configured to be input at least one AC power of single phase AC power and polyphaser AC power from a slow charger, a power factor corrector configured to include a plurality of full bridge circuits through which the AC power is input through the AC power input terminal, a link capacitor configured to connect in parallel with the power factor corrector, a switch network configured to include a first switch SW A provided to connect any one of a plurality of AC power input lines and a neutral line constituting the AC power input terminal with the power factor corrector, and a second switch provided to transfer one of a direct current power input from a quick charger and an alternating current power input from a slow charger to a high voltage battery and a controller configured (Continued)

to control the power factor corrector and the switch network according to the conditions of the AC power and the DC power.

8 Claims, 15 Drawing Sheets

(51) Int. Cl.
  *H02P 27/06* (2006.01)
  *H02M 7/5387* (2007.01)
  *H02J 7/06* (2006.01)
  *H02M 1/42* (2007.01)
  *H02M 1/44* (2007.01)
  *B60L 50/60* (2019.01)
  *B60L 53/60* (2019.01)
  *B60L 53/14* (2019.01)

(52) U.S. Cl.
  CPC ............ *H02J 7/06* (2013.01); *H02M 1/4225* (2013.01); *H02M 1/44* (2013.01); *H02M 7/53871* (2013.01); *H02P 27/06* (2013.01); *B60L 53/14* (2019.02); *B60L 2210/14* (2013.01); *H02J 2207/20* (2020.01)

(58) Field of Classification Search
  CPC .... H02M 7/5387; H02M 1/42; H02M 1/4225; H02M 7/53871; H02M 1/44
  USPC ......................................................... 320/109
  See application file for complete search history.

(56) References Cited

U.S. PATENT DOCUMENTS

| | | | |
|---|---|---|---|
| 2004/0078655 A1* | 4/2004 | Sung .......................... | G06F 1/30 714/14 |
| 2010/0080022 A1 | 4/2010 | Schmidt | |
| 2012/0049794 A1* | 3/2012 | Han ......................... | B60L 53/14 320/109 |
| 2013/0308361 A1* | 11/2013 | Steigerwald ............ | H02M 5/12 363/129 |
| 2014/0021780 A1* | 1/2014 | Choi ........................ | B60L 53/53 307/9.1 |
| 2015/0137751 A1* | 5/2015 | King ........................ | B60L 50/16 320/109 |
| 2015/0291043 A1* | 10/2015 | Nam ....................... | B60L 53/665 320/137 |
| 2016/0023560 A1* | 1/2016 | Yim ......................... | B60L 53/64 320/109 |
| 2017/0036555 A1* | 2/2017 | Albanna .............. | H02M 3/1582 |
| 2018/0019698 A1* | 1/2018 | Kim ........................ | H02J 7/007 |
| 2019/0023136 A1 | 1/2019 | Lee et al. | |
| 2019/0291585 A1 | 9/2019 | Yang et al. | |
| 2019/0299792 A1 | 10/2019 | Kim et al. | |

* cited by examiner

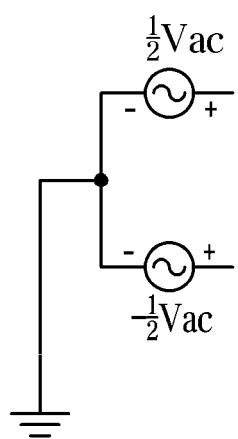
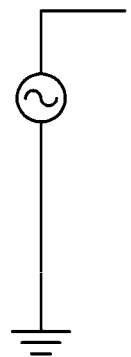
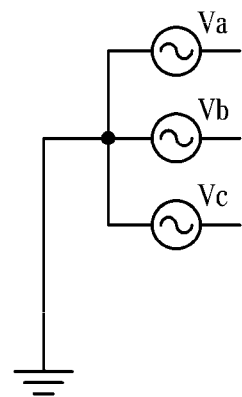
(I) 2-PHASE SYMMETRIC POWER SUPPLY
FIG. 4A
(II) SINGLE PHASE ASYMMETRICAL POWER SUPPLY
FIG. 4B
(III) 3-PHASE SYMMETRICAL POWER SUPPLY
FIG. 4C

BATTERY CHARGER FOR ELECTRIC VEHICLE

CROSS-REFERENCE TO RELATED APPLICATION(S)

This application claims priority to and the benefit of Korean Patent Application No. 10-2019-0124431, filed on Oct. 8, 2019, the entire contents of which are incorporated herein by reference.

FIELD

Embodiments and implementations of the present disclosure relate to a vehicle, and more particularly, to a battery charger for electric vehicle that runs using only the power of a motor.

BACKGROUND

The statements in this section merely provide background information related to the present disclosure and may not constitute prior art.

Unlike internal combustion engine cars that use fossil fuels as their primary energy source, electric vehicles use electric energy as their primary energy source. Therefore, an electric vehicle requires a high voltage battery capable of storing electrical energy, a motor as a power source, and an inverter for driving the motor.

Chargers for charging batteries in electric vehicles can be divided into slow chargers and quick chargers. The slow charger delivers the commercial AC power to the car as it is, while the quick charger converts the commercial AC power to DC and delivers it to the car. The slow charger is advantageous in increasing the penetration rate because of its simple structure and low price. However, in order to use a slow charger, an onboard charger (OBC) must be installed in an electric vehicle.

The AC power provided by a slow charger varies greatly depending on the country where the slow charger is installed. In order to charge the battery of an electric vehicle using such various types of AC power, the vehicle-mounted charger should be able to cope with various types of commercial AC power. In addition, it should be able to cope with the AC power of the slow charger as well as the DC power supplied through the metal charger.

SUMMARY

In view of the above, it is an aspect of the present disclosure to provide a battery charger for electric vehicle having a simple structure, small size, and capable of charging a battery with power supplied from various types of power sources.

In one form of the present disclosure, a battery charger for electric vehicle includes a motor configured to generate power for driving the electric vehicle, an inverter configured to provide the power to the motor, an AC power input terminal configured to be input at least one AC power of single phase AC power and polyphaser AC power from a slow charger, a power factor corrector configured to include a plurality of full bridge circuits through which the AC power is input through the AC power input terminal, a link capacitor configured to connect in parallel with the power factor corrector, a switch network configured to include a first switch provided to connect any one of a plurality of AC power input lines and a neutral line constituting the AC power input terminal with the power factor corrector, a second switch provided to transfer one of a direct current power input from a quick charger and an alternating current power input from a slow charger to a high voltage battery, and a controller configured to control the power factor corrector and the switch network according to the conditions of the AC power and the DC power.

In some implementations, the plurality of full bridge circuits includes a first full bridge circuit and a second full bridge circuit.

In some implementations, a first leg of the first full bridge circuit is connected to a first AC power input line of the AC power input terminal, and a second leg of the first full bridge circuit is selectively connected to any one of the neutral line and the second AC power input line of the AC power input terminal through the first switch.

In some implementations, the second switch includes a third switch connected between the first leg of the first full bridge circuit and a first leg of the second full bridge circuit, a fourth switch connected between the second leg of the first full bridge circuit and a second leg of the second full bridge circuit, and a fifth switch connected a node to which the first leg of the second full bridge circuit and the third switch are connected to a third input terminal of the AC power input terminal.

In some implementations, the second switch further includes a sixth switch having one end connected to a positive electrode of the link capacitor, a seventh switch having one end connected to a negative electrode of the link capacitor, an eighth switch connected between the other end of the sixth switch and one side of the inverter, and wherein the battery charger is connected to the negative electrode of the link capacitor and the other side of the inverter through the seventh switch.

In some implementations, the second switch further includes a ninth switch connecting a node to which the first leg of the second full bridge circuit and the third switch are connected to the other end of the sixth switch, and a tenth switch connecting the node connected to the second leg of the second full bridge circuit and the fourth switch to the other end of the sixth switch.

In some implementations, the second switch further includes an eleventh switch provided between one side of the inverter and the positive electrode of the high voltage battery.

In some implementations, the second switch further includes a twelfth switch provided to connect between the positive electrode of the quick charger and the positive electrode of the high voltage battery, and a thirteenth switch provided to connect between the negative electrode of the quick charger and the negative electrode of the high voltage battery.

In some implementations, the second switch further includes a fourteenth switch connects the other end of the sixth switch and the other end of the seventh switch, the positive electrode of the high voltage battery, and the positive electrode of the quick charger to the neutral point of the motor.

In some implementations, the condition of the input AC power includes the conditions of polyphaser and single phase of the input AC power.

In some implementations, the condition of the input AC power includes a symmetrical and asymmetrical power supply condition of the input AC power.

In another form of the present disclosure, a battery for electric vehicle includes a motor configured to generate power for driving the electric vehicle; an inverter configured to provide the power to the motor, an AC power input terminal configured to be input at least one AC power of single phase AC power and polyphaser AC power from a slow charger, a power factor corrector configured to include a plurality of full bridge circuits through which the AC power is input through the AC power input terminal, a link capacitor configured to connect in parallel with the power factor corrector, a switch network configured to include a first switch provided to connect any one of a plurality of AC power input lines and a neutral line constituting the AC power input terminal with the power factor corrector, and a second switch provided to transfer one of a direct current power input from a quick charger and an alternating current power input from a slow charger to a high voltage battery, and a controller configured to control the power factor corrector and the switch network according to the conditions of the AC power and the DC power. The second switch includes an eighth switch connected between one side of each of the plurality of full bridge circuits and one side of the inverter, an eleventh switch provided between one side of the inverter and the positive electrode of the high voltage battery, a twelfth switch provided to connect between the positive electrode of the quick charger and the positive electrode of the high voltage battery, a thirteenth switch provided to connect between the negative electrode of the quick charger and the negative electrode of the high voltage battery, and a fourteenth switch provided to connect the positive electrode of the high voltage battery and the positive electrode of the quick charger to the neutral point of the motor.

In some implementations, the plurality of full bridge circuits includes a first full bridge circuit and a second full bridge circuit.

In some implementations, a first leg of the first full bridge circuit is connected to a first AC power input line of the AC power input terminal, and a second leg of the first full bridge circuit is selectively connected to any one of the neutral line and the second AC power input line of the AC power input terminal through the first switch.

In some implementations, the second switch includes a third switch connected between the first leg of the first full bridge circuit and a first leg of the second full bridge circuit, a fourth switch connected between the second leg of the first full bridge circuit and a second leg of the second full bridge circuit, and a fifth switch connected a node to which the first leg of the second full bridge circuit and the third switch are connected to a third input terminal of the AC power input terminal.

In some implementations, the second switch further includes a sixth switch having one end connected to a positive electrode of the link capacitor, and a seventh switch having one end connected to a negative electrode of the link capacitor, wherein the battery charger is connected to the negative electrode of the link capacitor and the other side of the inverter through the seventh switch.

In some implementations, the second switch further includes a tenth switch connecting the node connected to the second leg of the second full bridge circuit and the fourth switch to the other end of the sixth switch.

In some implementations, the condition of the input AC power includes the conditions of polyphaser and single phase of the input AC power.

In some implementations, the condition of the input AC power includes a symmetrical and asymmetrical power supply condition of the input AC power.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

These and/or other aspects of the invention will become apparent and more readily appreciated from the following description of the embodiments, taken in conjunction with the accompanying drawings of which:

FIGS. 4A, 4B, and 4C are diagrams illustrating various kinds of power sources that a vehicle-mounted charger according to an embodiment of the present disclosure can accommodate.

The drawings described herein are for illustration purposes only and are not intended to limit the scope of the present disclosure in any way.

DETAILED DESCRIPTION

Figure 1:
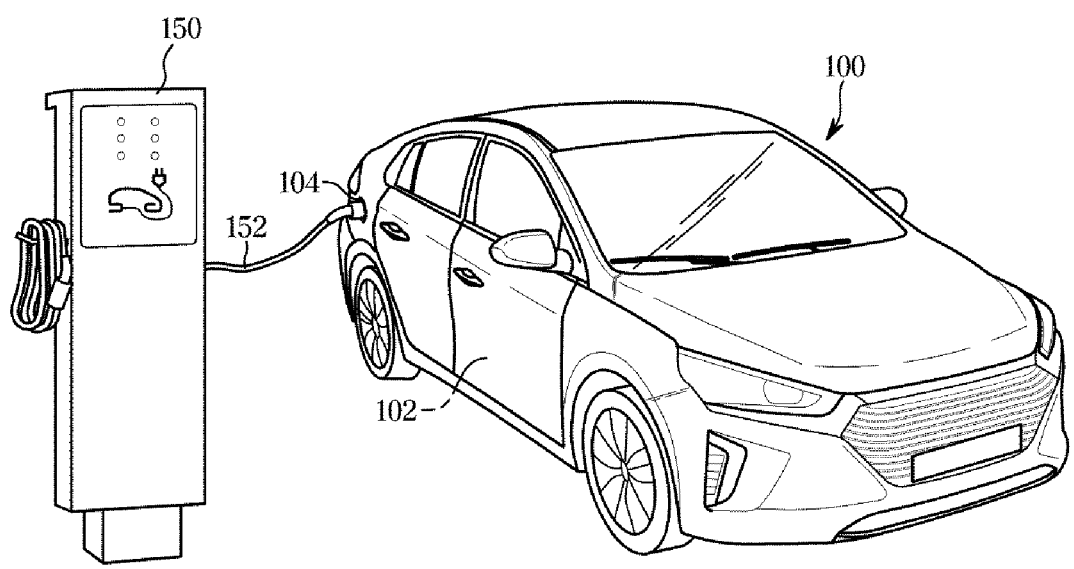
FIG. 1 is a view showing an electric vehicle according to an embodiment of the present disclosure.

FIG. 1 is a view showing an electric vehicle according to an embodiment of the present disclosure.

The electric vehicle 100 shown in FIG. 1 uses a motor (see 212 in FIG. 2) to obtain a driving force for rotating the wheel. Therefore, power is required to drive the motor 212, and a high voltage battery 102 is required to store this power. A typical internal combustion engine car is also provided with an auxiliary battery on one side of the engine room. However, the electric vehicle 100 requires a relatively large capacity high voltage battery 102 than a general auxiliary battery. In the electric vehicle 100 according to the embodiment of the present invention, a high voltage battery 102 is installed in a space below the second row of passenger seats. The power stored in the high voltage battery 102 may be used to drive the motor 212 to generate power. High voltage battery 102 according to an embodiment of the present disclosure may be a lithium battery.

The electric vehicle 100 is provided with a charging socket 104. The high voltage battery 102 may be charged by connecting the charging connector 152 of the external slow charger 150 to the charging socket 104. That is, when the charging connector 152 of the slow charger 150 is connected to the charging socket 104 of the electric vehicle 100, the high voltage battery 102 of the electric vehicle 100 is charged. Although not shown in FIG. 1, the electric vehicle 100 may be charged using a rapid charger (see 250 of FIG. 2) in addition to the slow charger 150.

Figure 2:
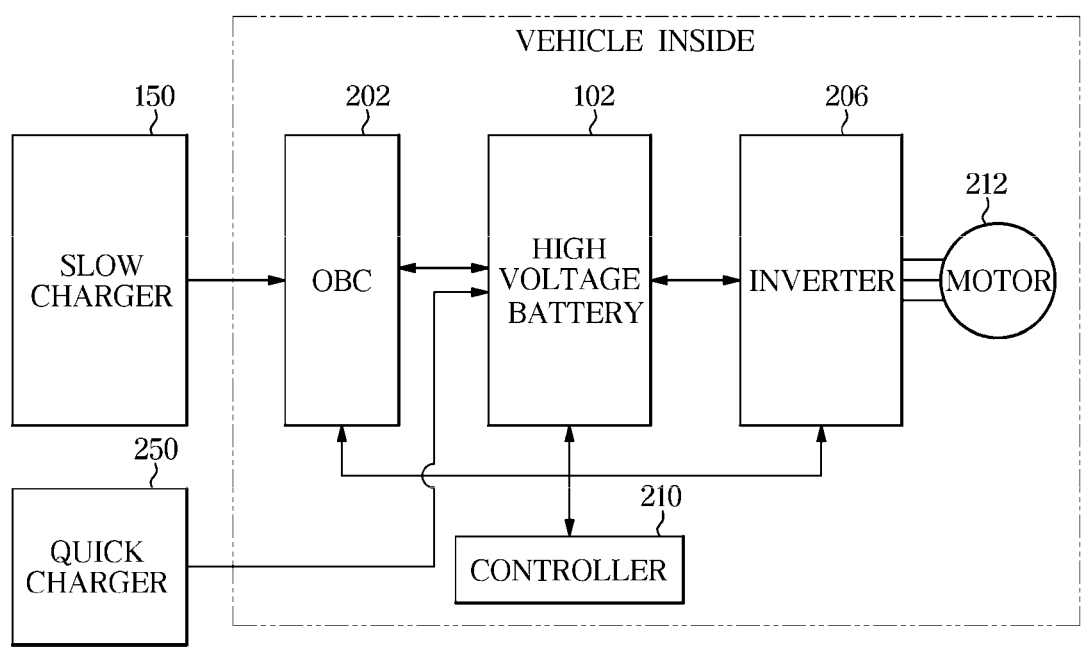
FIG. 2 is a view showing a charger for an electric vehicle according to an embodiment of the present disclosure.

FIG. 2 is a view showing a charger for an electric vehicle according to an embodiment of the present disclosure.

Slow charger 150 or quick charger 250 may be used to charge the high voltage battery 102 of the electric vehicle 100. The high voltage battery 102 may have a charging voltage of 350V to 850V. The slow charger 150 supplies commercial AC power to the electric vehicle 100 as it is. The AC power supplied through the slow charger 150 is converted into a DC voltage of a predetermined level inside the electric vehicle 100. The quick charger 250 receives an external DC voltage of 400~800V to directly charge a high voltage battery 102 without a separate DC conversion process.

Inside the electric vehicle 100, an on-board charger (OBC) 202 is involved in charging the high voltage battery 102. The on-board charger 202, also referred to as 'OBC', charges the high voltage battery 102 by converting commercial AC power supplied from the slow charger 150 into a DC voltage of approximately 800V. The slow charger 150 supplies commercial AC power to the electric vehicle 100 as it is. The AC voltage supplied from the slow charger 150 is used to charge the high voltage battery 102 after being converted into a DC voltage by the on-board charger 202 inside the electric vehicle 100.

In FIG. 2, an inverter 206 converts the power of the high voltage battery 102 to have the electrical characteristics required by the motor 212 and transmits the same to the motor 212. The motor 212 generates a driving force by rotating by the power delivered through the inverter 206. In the charger shown in FIG. 2, the motor 212 and the inverter 206 can be used to charge the high voltage battery 102 together with the on-board charger 202 as necessary.

Figure 3:
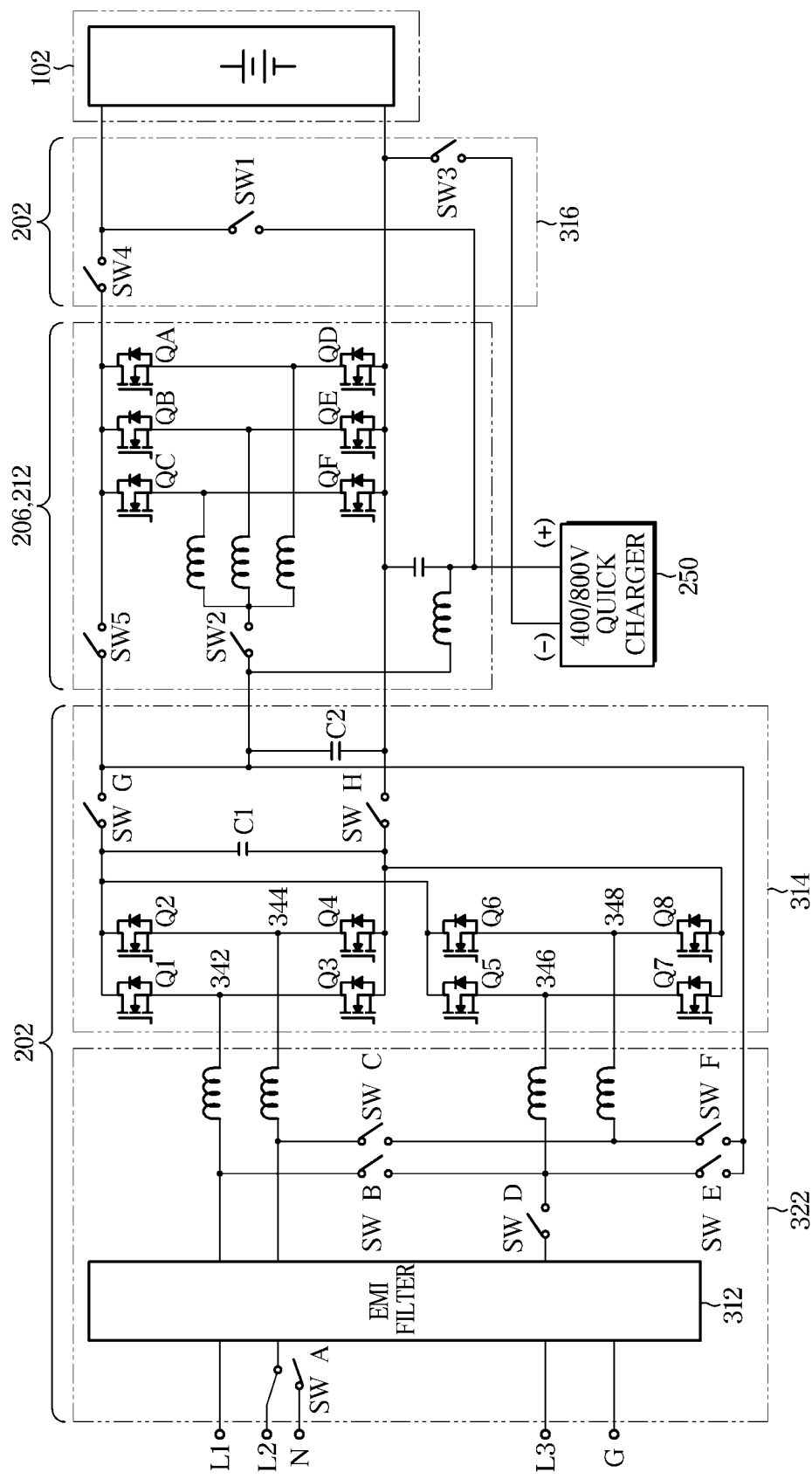
FIG. 3 is a view showing the configuration of a vehicle-mounted charger according to an embodiment of the present disclosure.

FIG. 3 is a view showing the configuration of a vehicle-mounted charger according to an embodiment of the present disclosure. FIG. 3 also shows how the on-board charger 202 according to an embodiment of the present disclosure is connected to the high voltage battery 102, the inverter 206, and the motor 212.

The on-board charger 202 includes an input 322, a boost power factor corrector 314, and a quick charger connector 316.

An external commercial AC power supply (e.g., commercial AC power from the slow charger 150) is input to the input 322. The input 322 has five input lines L1 L2, L3, N, G, an EMI filter (Electro Magnetic Interference Filter) 312, and switches SW A, SW B, SW C, SW D, SW E, SW F.

The EMI filter 312 is provided to remove noise included in the input commercial AC power. The EMI filter 312 has five input lines L1, L2, L3, N, and G connected thereto. Commercial AC power is input from the external commercial AC power supply to the EMI filter 312 through input lines L1, L2, L3, N, and G. L1, L2, and L3 are AC power input lines, N is a neutral line, and G is a ground line.

AC power up to three phases may be input to the EMI filter 312 through the AC power input lines L1, L2, and L3 among the input lines L1, L2, L3, N and G. That is, three-phase AC power may be input to the EMI filter 312 through all of the AC power input lines L1, L2, and L3. Alternatively, two-phase AC power may be input to the EMI filter 312 through only the AC power input lines L1 and L2. Alternatively, single-phase AC power may be input to the EMI filter 312 through only the AC power input line L1 and the neutral line N.

The switch SW A of the input 322 connects one of the AC power input line L2 and the neutral line N to the EMI filter 312. When the input commercial AC power is three-phase or two-phase, the switch SW A is controlled such that the AC power input line L2 is connected to the EMI filter 312. If the input commercial AC power is single phase, the switch SW A is controlled such that the neutral line N is connected to the EMI filter 312. Another switch SW B, SW C, SW D, SW E, and SW F of the input 322 connects the EMI filter 312 and the boost power factor corrector 314 of the rear stage. The switch SW B, SW C, SW D, SW E, SW F will be described in more detail in the following description of the boost power factor corrector 314.

The boost power factor corrector 314 includes a first full bridge circuit composed of switching elements Q1, Q2, Q3, and Q4 and a second full bridge circuit composed of switching elements Q5, Q6, Q7, and Q8. The first to fourth legs 342, 344, 346 and 348 formed between Q1 and Q3, Q2 and Q4, Q5 and Q7, and Q6 and Q8, respectively, are connected to the EMI filter 312. Each of the first to fourth legs 342, 344, 346, and 348 may include an inductor component.

In the battery charger according to the exemplary embodiment of the present disclosure illustrated in FIG. 3, the full bridge circuit configuring the boost power factor corrector 314 may include four switching elements Q1, Q2, Q3, Q4, and two legs 342, 344 form a group (first full bridge circuit), and another four switching elements Q5, Q6, Q7 and Q8 and two legs 346 and 348 form another group (second full bridge circuit). The first full bridge circuit and the second full bridge circuit are connected in parallel to each other between the EMI filter 312 and the capacitor C1 described later.

In the first full bridge circuit, legs 342 are connected to an AC power input line L1 via an EMI filter 312, Another leg 344 is connected to the AC power input line L2 and the neutral line N through an EMI filter 312. Which of the AC power input line L2 and the neutral line N are connected to the leg 344 is determined according to the on/off of the switch SW A provided at the input end 312. The AC power input line L2 is connected to the leg 344 when the switch SW A is turned off, and the neutral line N is connected to the leg 344 when the switch SW A is turned on.

In the second full bridge circuit, the leg 346 is connected to an AC power input line L1 through an EMI filter 312 at turn-on of the switch SW B and the AC power input line L3 is connected through the EMI filter 312 when the switch SW D is turned on. The other leg 348 is connected to the AC power input line L2 and the neutral line N through the EMI filter 312 when the switch SW C is turned on. Accordingly, when the switch SW B is turned on, the leg 346 is connected to the AC power input line L1, and when the switch SW D is turned on, the leg 346 is connected to the AC power input line L3. In addition, when the switch SW C is turned on, the AC power input line L2 and the neutral line N are connected to the leg 348 through the EMI filter 312. Which of the AC power input line L2 and the neutral line N is connected to the leg 348 is determined according to the on/off of the switch SW A provided at the input end 312. The AC power input line L2 is connected to the leg 348 when the switch SW A is turned off, and the neutral line N is connected to the leg 348 when the switch SW A is turned on. In addition, the leg 346 is connected to the rear end of the switch SW G to be described later through the switch SW E, and the leg 348 is connected to the rear end of the switch SW G through the switch SW F. Therefore, when both the switch SW B and the switch SW E are turned on, the AC power input line L1 is connected to the rear end of the switch SW G. In addition, when both the switch SW C and the switch SW F are turned on, one of the AC power input line L2 and the neutral line N is connected to the rear end of the switch SW G.

The boost power factor corrector 314 is provided with a capacitor C1, which is the aforementioned PFC link capacitor. Capacitor C1 is connected in parallel with both ends of the first full bridge circuit and both ends of the second full bridge circuit.

The boost power factor corrector 314 is further provided with a switch SW G, and SW H. The switch SW G and SW H are connected to the positive electrode and the negative electrode of the capacitor C1, respectively. The positive electrode of the capacitor C1 is connected to the neutral point of the motor 212 through the switch SW G and the switch SW 2. The negative electrode of the capacitor C1 is connected to the neutral point of the motor 212 through the switch SW H, the capacitor C2, and the switch SW 2.

The positive electrode of the quick charger 250 is connected to the positive electrode of the high voltage battery 102 through the switch SW 1 of the quick charger connector 316. The negative electrode of the quick charger 250 is connected to the (1) electrode of the high voltage battery 102 through the switch SW 3 of the quick charger connector 316. In addition, the positive electrode and the negative electrode of the quick charger 250 are connected to the bottom QF, QE, and QD of the inverter 206. The switch SW 2 described above is connected between the boost power factor corrector 314 and the motor 212, and the switch SW 5 is connected between the switch SW G of the boost power factor corrector 314 and the inverter 206. The switch SW 4 is connected between the inverter 206 and the positive electrode of the high voltage battery 102.

The inverter 206 is composed of six switching elements QA, QB, QC, QD, QE and QF. The current generated by the switching element QC and QF, the current generated by the switching element QB and QE, and the current generated by the switching element QA and QD are applied to each three-phase coils of the motor 212.

A plurality of switches SW A, SW B, SW C, SW D, SW E, SW F, SW G, SW 1, SW 2, SW 3, a plurality of switching elements Q1, Q2, Q3, Q4, Q5, Q6, Q7, Q8, and a plurality of switches QA, QB, QC, QD, QE, and QF constituting the inverter 206 are controlled by the controller 210 described above with reference to FIG. 2 to be turned on and off.

In an embodiment of the present disclosure, the high voltage battery 102 may be charged with various types of commercial AC power or high voltage through various on/off combinations of a plurality of switches SW A, SW B, SW C, SW D, SW E, SW F, SW G, SW 1, SW 2, SW 3 and a plurality of switching elements Q1, Q2, Q3, Q4, Q5, Q6, Q7, Q8 and a plurality of switches QA, QB, QC, QD, QE, and QF constituting the inverter (206) constituting the switch network. Various types of commercial AC power will be described in detail with reference to FIG. 4.

FIG. 4 is a diagram illustrating various kinds of power sources that a vehicle-mounted charger according to an embodiment of the present disclosure can accommodate.

FIG. 4A is a diagram illustrating a bi-phase symmetric power source. As shown in FIG. 4A, the two-phase symmetric power supply is supplied by dividing the voltage of the supply power into two voltages (½ Vac) (−½ Vac). It is called a two-phase symmetric power supply because the two voltages (½ Vac) (−½ Vac) have opposite phases. Two-phase symmetrical power sources such as those shown in FIG. 4A are mainly used in North America.

FIG. 4B is a diagram illustrating a single-phase asymmetric power source. As shown in FIG. 4B, in the single-phase asymmetric power supply, the voltage of the supply power is supplied in the form of a single voltage Vac of a single phase. Since a single voltage (Vac) has a single phase, it is called a single-phase asymmetric power supply. Single-phase asymmetrical power sources such as those shown in FIG. 4B are mainly used in Korea, North America, and Europe.

FIG. 4C shows a three-phase symmetric power source. As shown in FIG. 4C, the three-phase asymmetric power supply is supplied by dividing the voltage of the supply power into three voltages Va, Vb, and Vc. Since three voltages Va, Vb, and Vc have different phases, they are referred to as three-phase asymmetric power supplies. Three-phase asymmetrical power sources, such as those shown in FIG. 4C, are mainly used in the European region.

As described above, since a variety of types of commercial AC power varies from country to country, a slow charger 150 for converting and supplying commercial AC power to DC and a quick charger 250 for supplying a high level of DC voltage are mixed. The on-board charger 202 according to the present disclosure attempts to cope with various types of commercial AC power and rapid charging by country through on/off combination of a switch network.

For example, when a high voltage battery 102 having a charge request voltage of 350 to 850 V is charged with AC power of North American single-phase 240 Vrms, the on-board charger 202 implements a boost power factor corrector and the inverter 206 and the motor 212. By bypassing, the high voltage battery 102 can be charged.

In addition, when a high voltage battery 102 having a charge request voltage of 350 to 550 V is charged with AC power of North American single-phase 120 Vrms, the on-board charger 202 implements a boost power factor corrector, and bypass the inverter 206 and the motor 212, so that it allows the high voltage battery 102 to charge.

In addition, when a high voltage battery 102 having a charge request voltage of 550 to 850 V is charged with AC power of North American single-phase 120 Vrms, the on-board charger 202 implement a boost power factor corrector and also boosts the inverter 206 and the motor 212. By implementing the power factor corrector, the high voltage battery 102 can be charged.

In addition, when a high voltage battery 102 having a charge request voltage of 350 to 650 V is charged with AC power of domestic/European single-phase 220 Vrms, the on-board charger 202 implements a boost power factor corrector and a buck converter, and an inverter 206 and motor 212 bypasses to allow high voltage battery 102 to be charged.

In addition, when a high voltage battery 102 having a charge request voltage of 650 to 850 V is charged with AC power of a domestic/European single-phase 220 Vrms, the on-board charger 202 implements a boost power factor corrector and the inverter 206 and the motor 212 bypasses to allow high voltage battery 102 to be charged.

In addition, when a high voltage battery 102 having a charge request voltage of 350 to 600 V is charged with AC power of a European tri-phase 380 Vrms, the on-board charger 202 implements a boost power factor corrector and the inverter 206 and the motor 212 bypasses to allow high voltage battery 102 to be charged.

In addition, when a high voltage battery 102 having a charge request voltage of 600 to 850 V is charged with AC power of a European tri-phase 380 Vrms, the on-board charger 202 implements a boost power factor corrector and the inverter 206 and the motor 212 bypasses to allow high voltage battery 102 to be charged.

In addition, when the high voltage battery 102 having a charge request voltage of 500 to 850 V is to be charged with DC power of 200 to 500 V (quick charge), the on-board charger 202 is deactivated, and implements a boost converter in the inverter 206 and the motor 212 to allow the high voltage battery 102 to be charged.

In addition, when the high voltage battery 102 having the charge request voltage of 500 to 850 V is to be charged with a DC power of 200 to 500 V (quick charge), the on-board charger 202 is deactivated and the inverter 206 and the motor 212 are boosted to implement a converter allows the high voltage battery 102 to be charged.

FIGS. 5 to 13 are briefly summarized as follows.

FIGS. 5 to 13 are diagrams illustrating on/off combinations of switch networks for responding to various types of commercial AC power and rapid charging by country.

Figure 5:
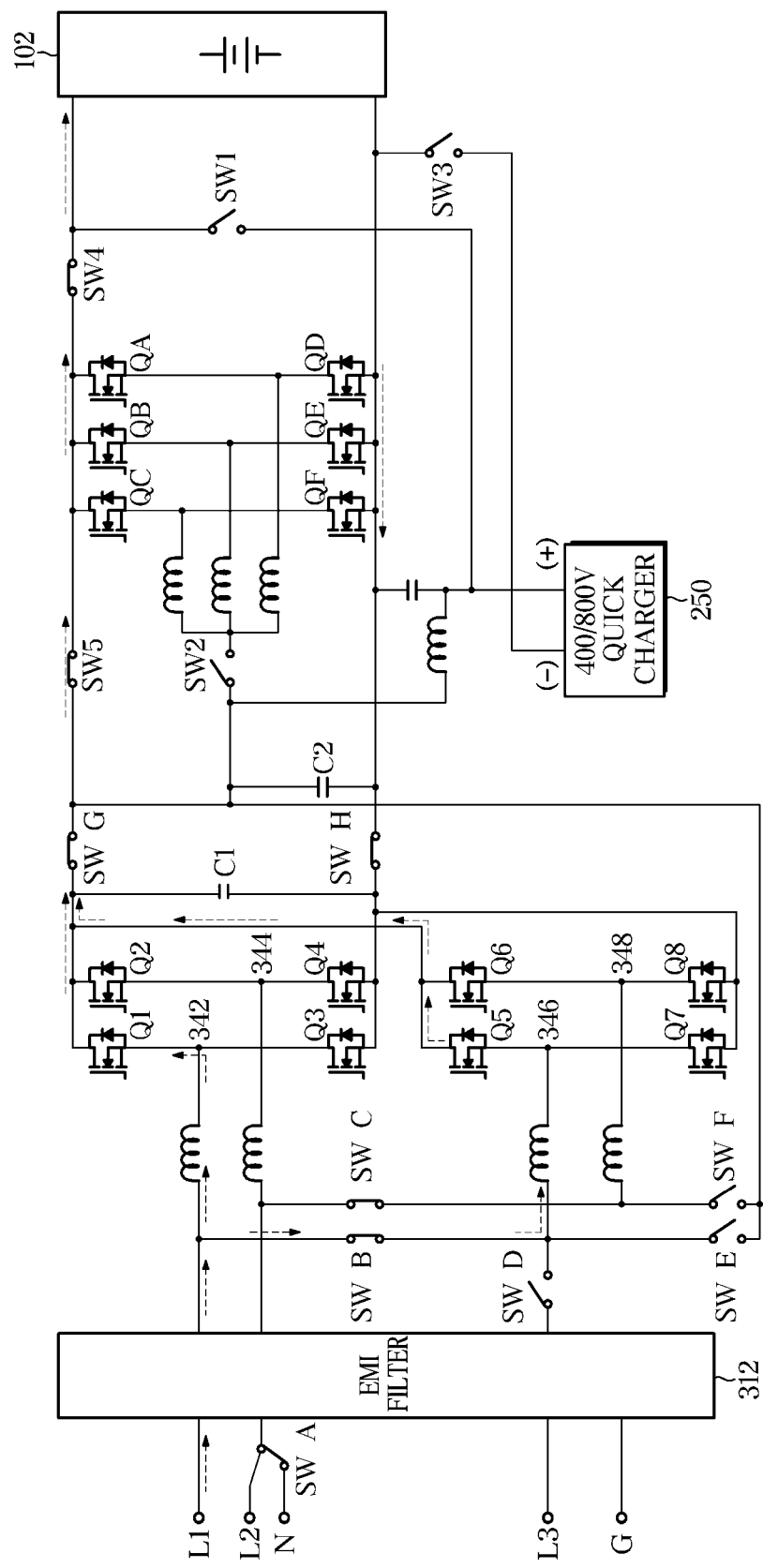
FIG. 5 is a diagram illustrating an on/off combination of a switch network for responding to a single-phase power source in North America.

FIG. 5 is a diagram illustrating a case where a high voltage battery 102 having a charge request voltage of 350 to 850 V is charged with AC power of a North American single-phase 240 Vrms.

Figure 6:
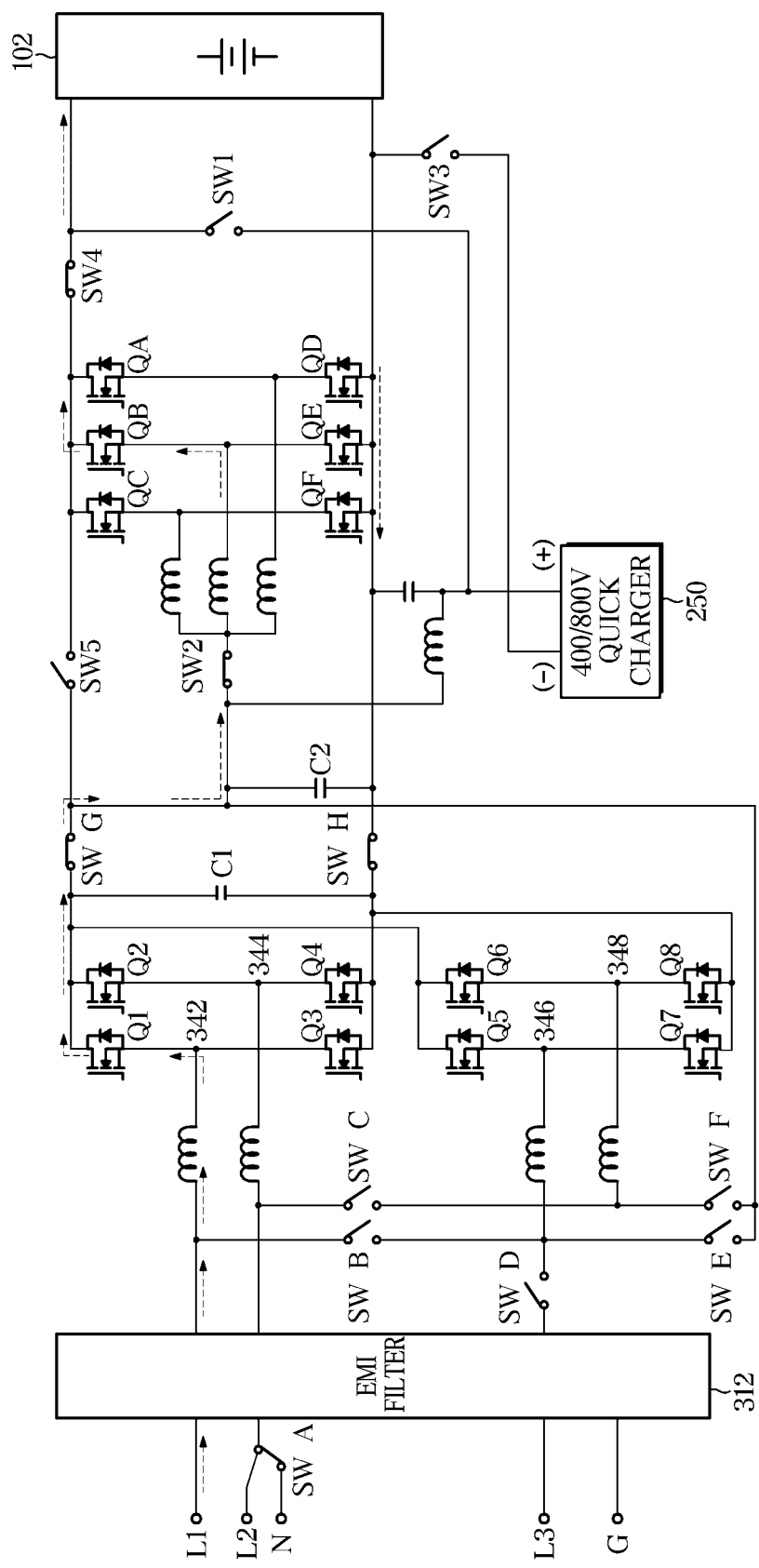
FIG. 6 is a diagram illustrating an on/off combination of a switch network corresponding to a single-phase power source in North America.

FIG. 6 is a diagram illustrating a case where a high voltage battery 102 having a charge request voltage of 350 to 550 V or a 550 to 850 V is charged with AC power of North American single phase 120 Vrms.

Figure 7A:
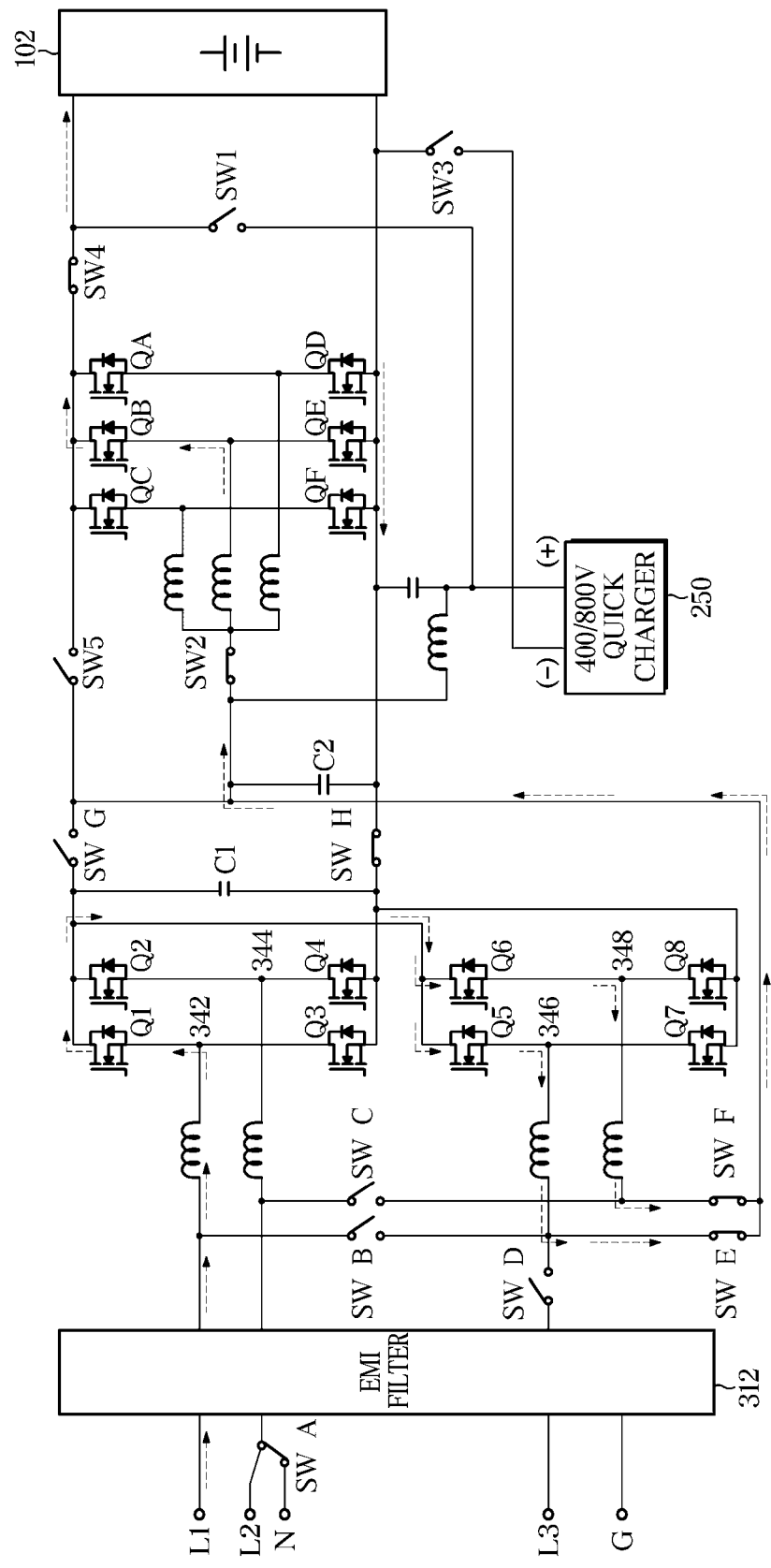
FIGS. 7A and 7B are diagrams illustrating an on/off combination of a switch network corresponding to a single-phase power supplies in Korea and Europe.
Figure 7B:
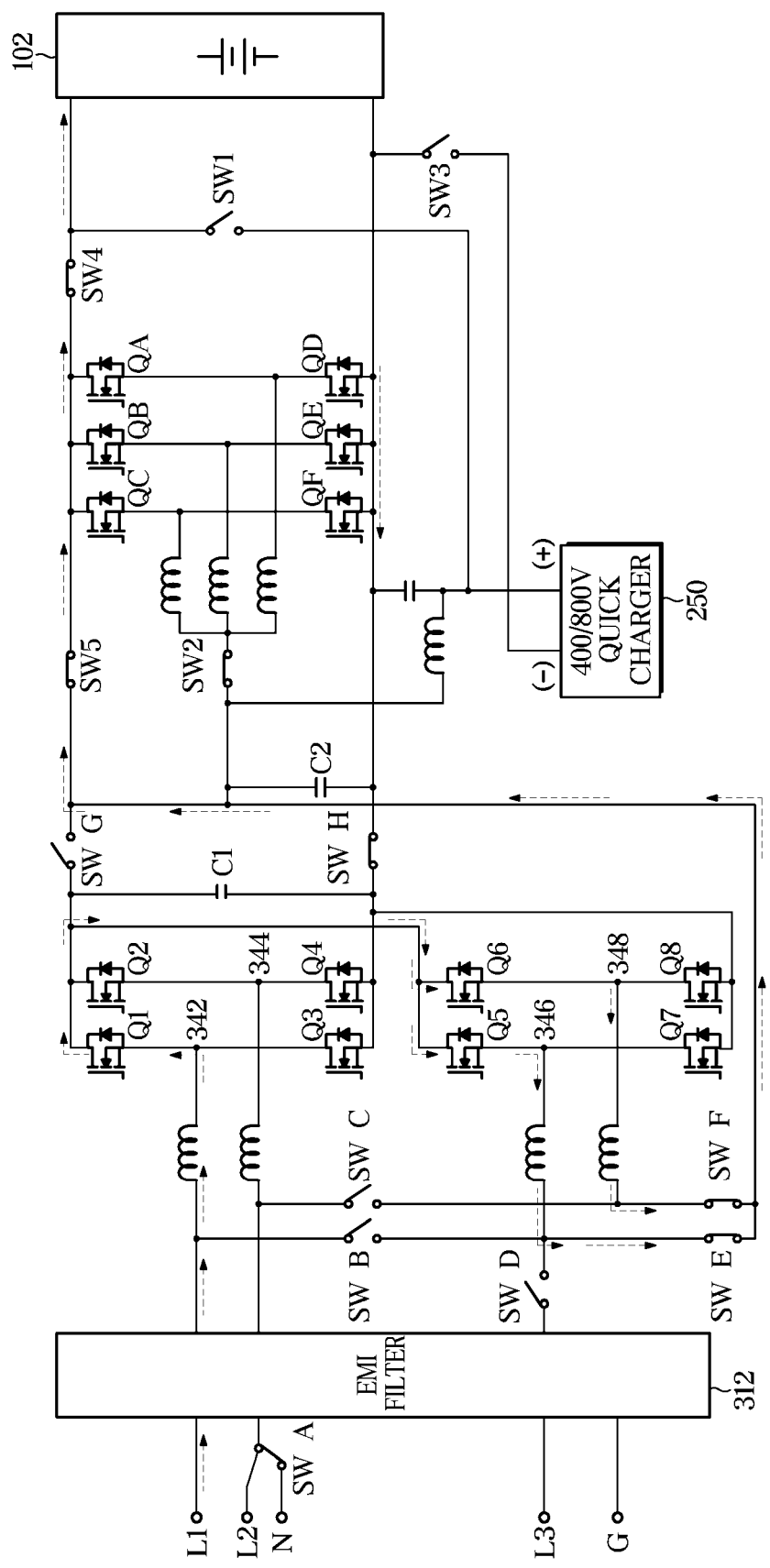

FIGS. 7A and 7B illustrate a case where a high voltage battery 102 having a charge request voltage of 350 to 650 V or 650 to 850 V is charged with AC power of a domestic/Europe single phase 220 Vrms.

Figure 8A:
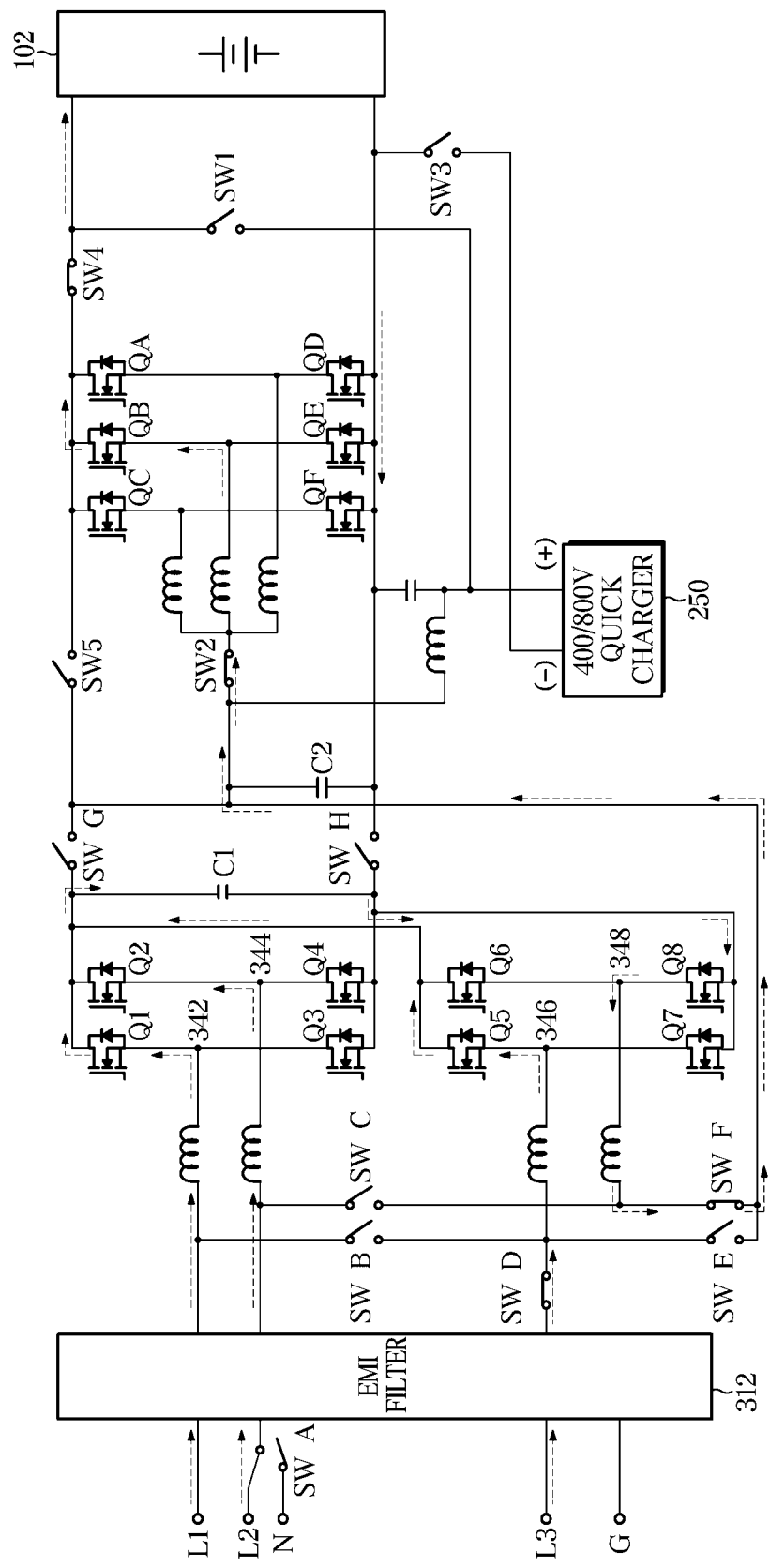
FIGS. 8A and 8B are diagrams illustrating an on/off combination of a switch network corresponding to a three-phase power supplies in Korea and Europe.
Figure 8B:
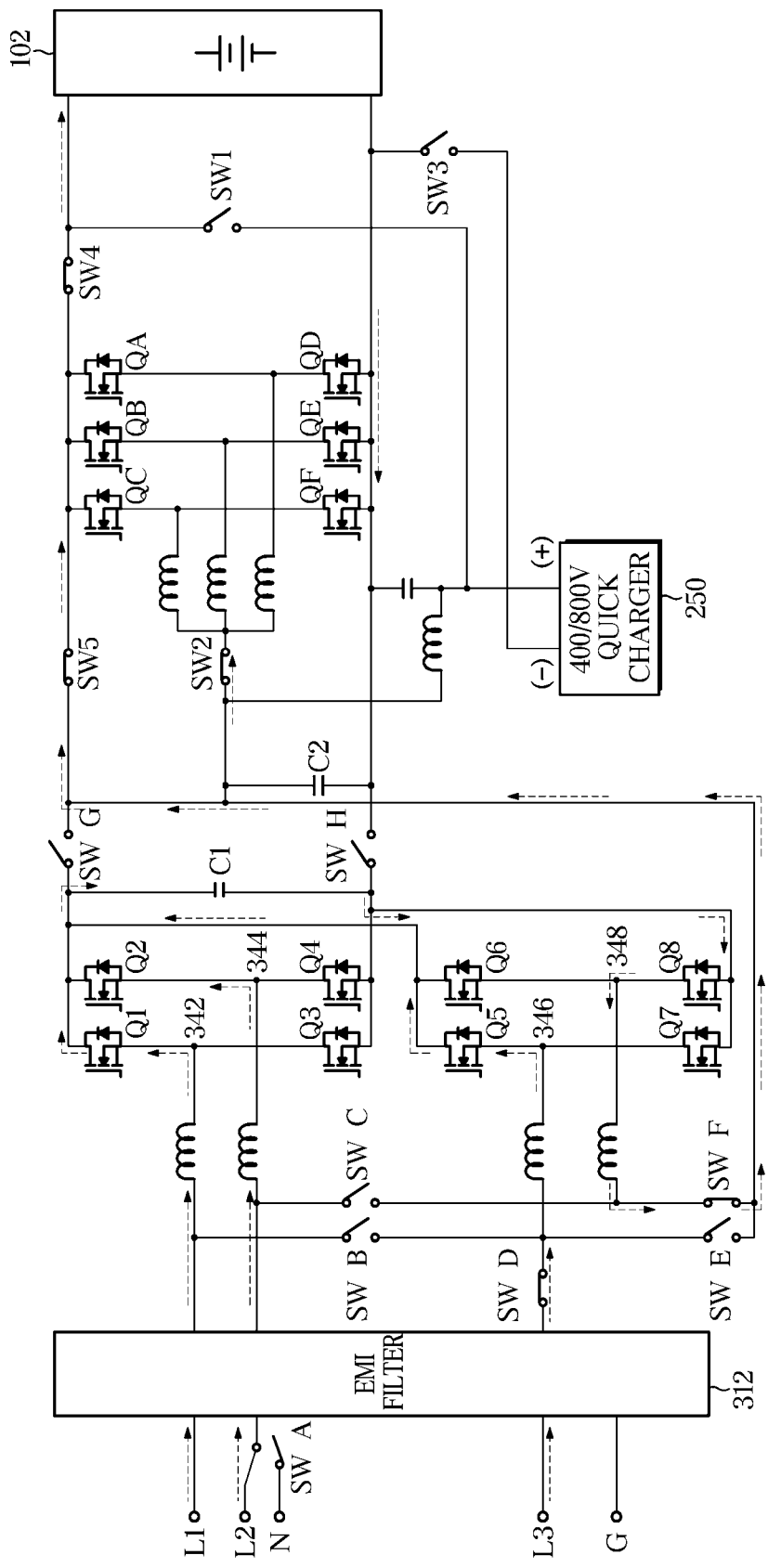

FIGS. 8A and 8B illustrate a case where a high voltage battery 102 having a charge request voltage of 350 to 600 V or 600 to 850 V is charged with AC power of three phases of 380 Vrms of Europe.

Figure 9:
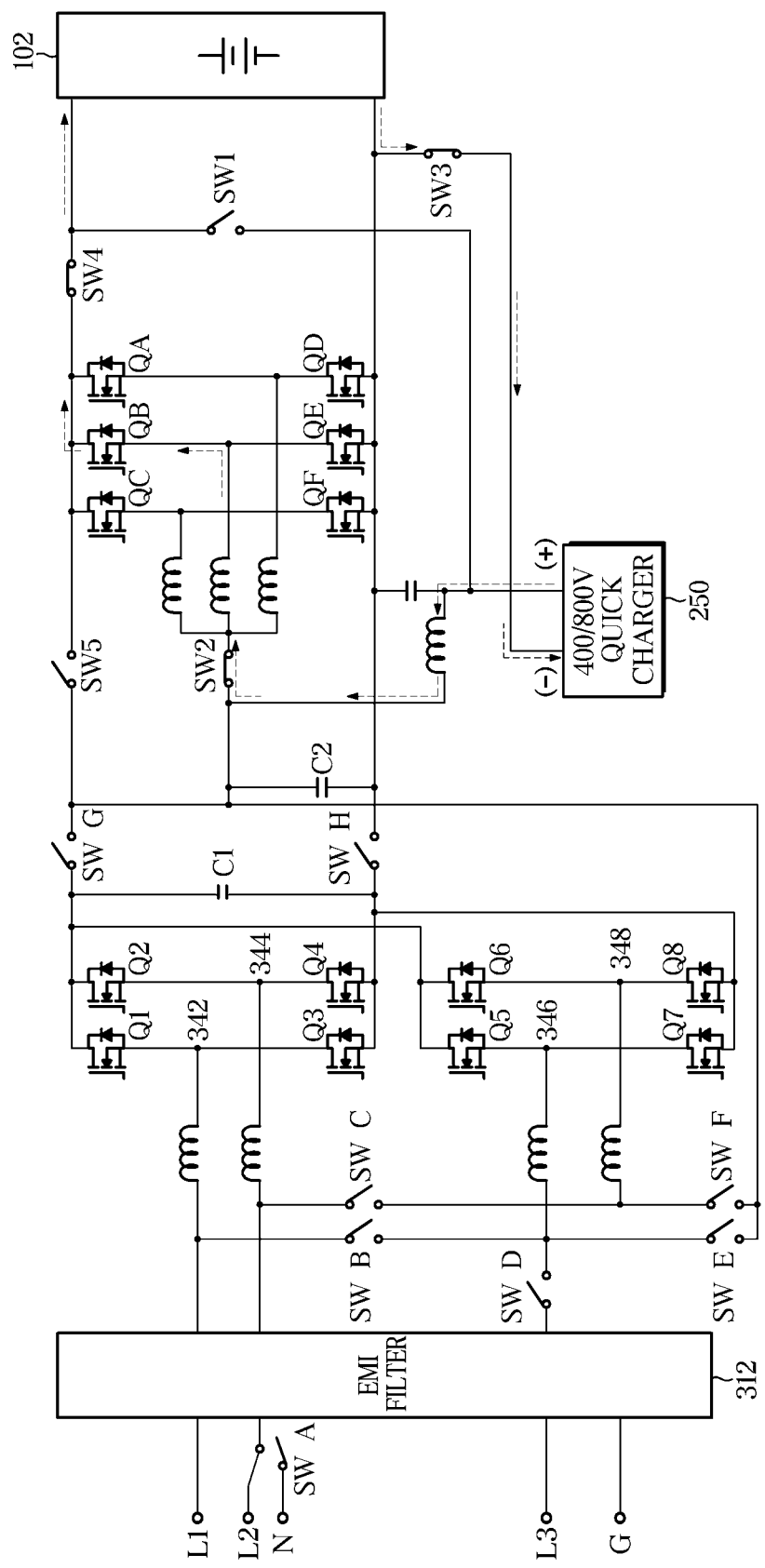
FIG. 9 is a diagram illustrating an on/off combination of a switch network corresponding to a quick charger.

FIG. 9 is a diagram illustrating a case where a high voltage battery 102 having a charge request voltage of 500 to 850 V is charged through a motor 212 and an inverter 206 at a DC power of 200 to 500 V.

Figure 10:
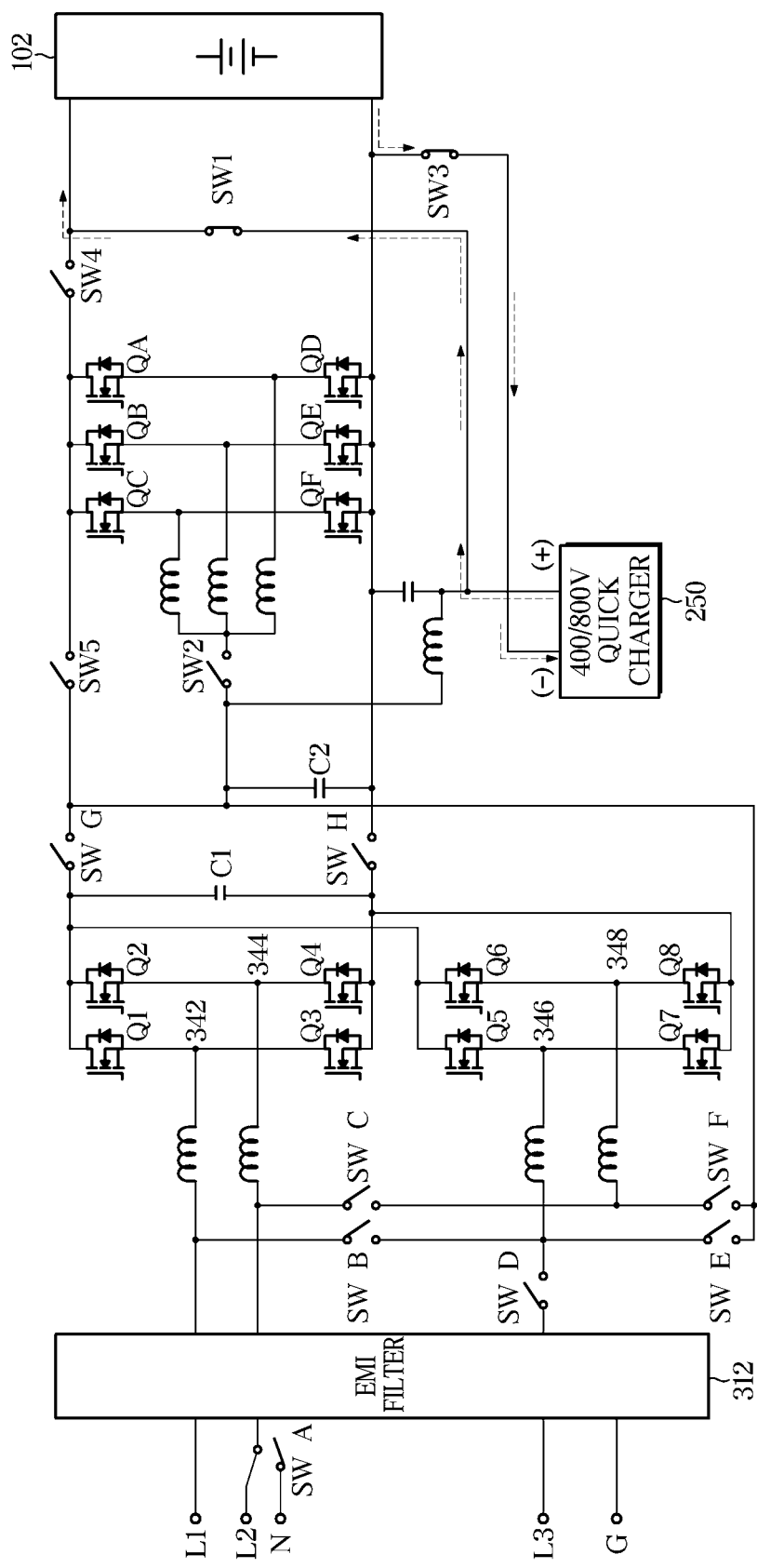
FIG. 10 is a diagram illustrating an on/off combination of a switch network corresponding to a quick charger.

FIG. 10 is a diagram illustrating a case in which a high voltage battery 102 having a charge request voltage of 500 to 850 V is directly charged with 800 V DC power without using the motor 212 and the inverter 206.

Figure 11:
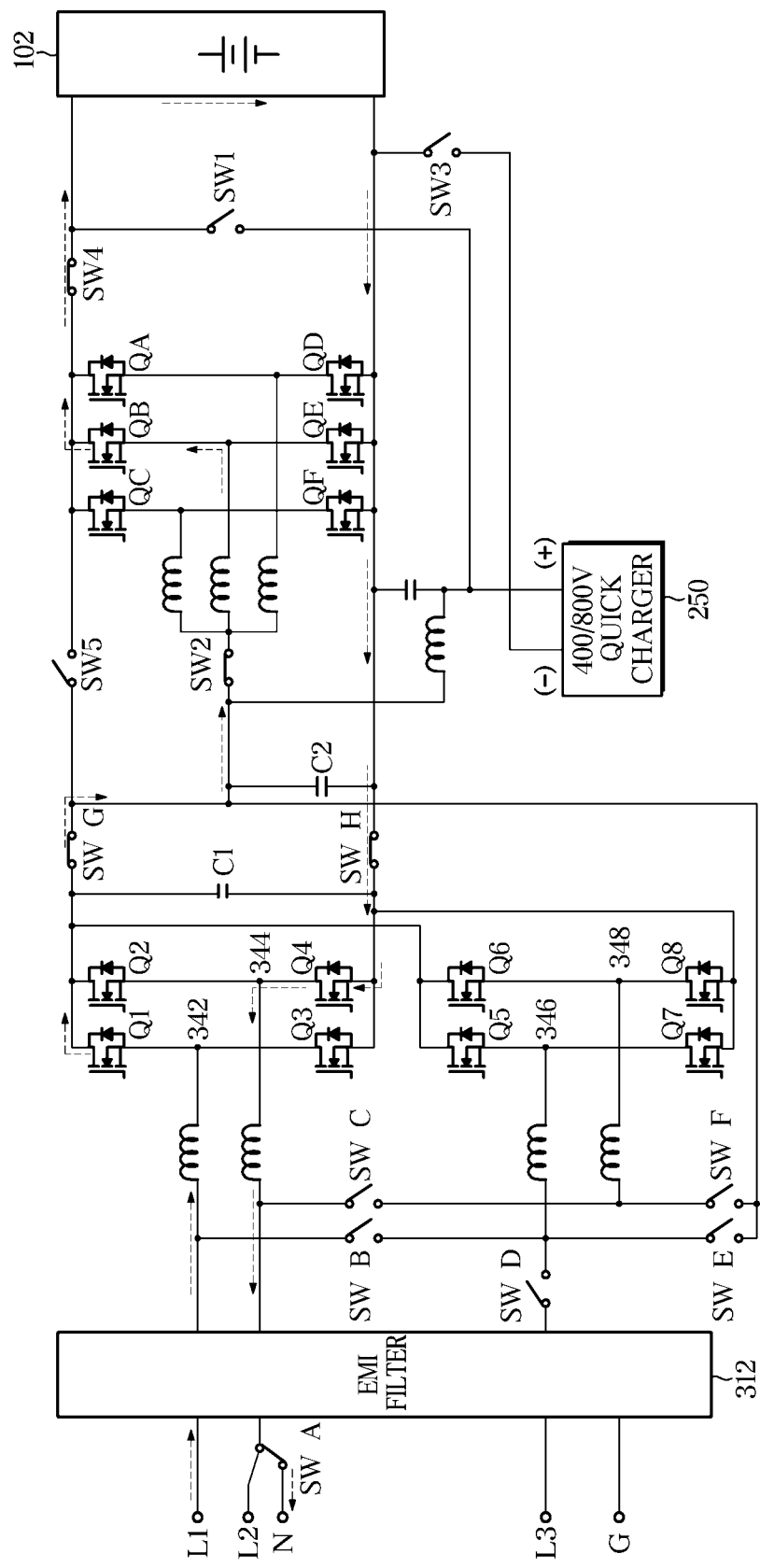
FIG. 11 is a diagram illustrating an on/off combination of a switch network corresponding to a single-phase low voltage power supply.

FIG. 11 is a diagram illustrating a case where a high voltage battery 102 is charged by receiving power from a single-phase low voltage power source.

Figure 12:
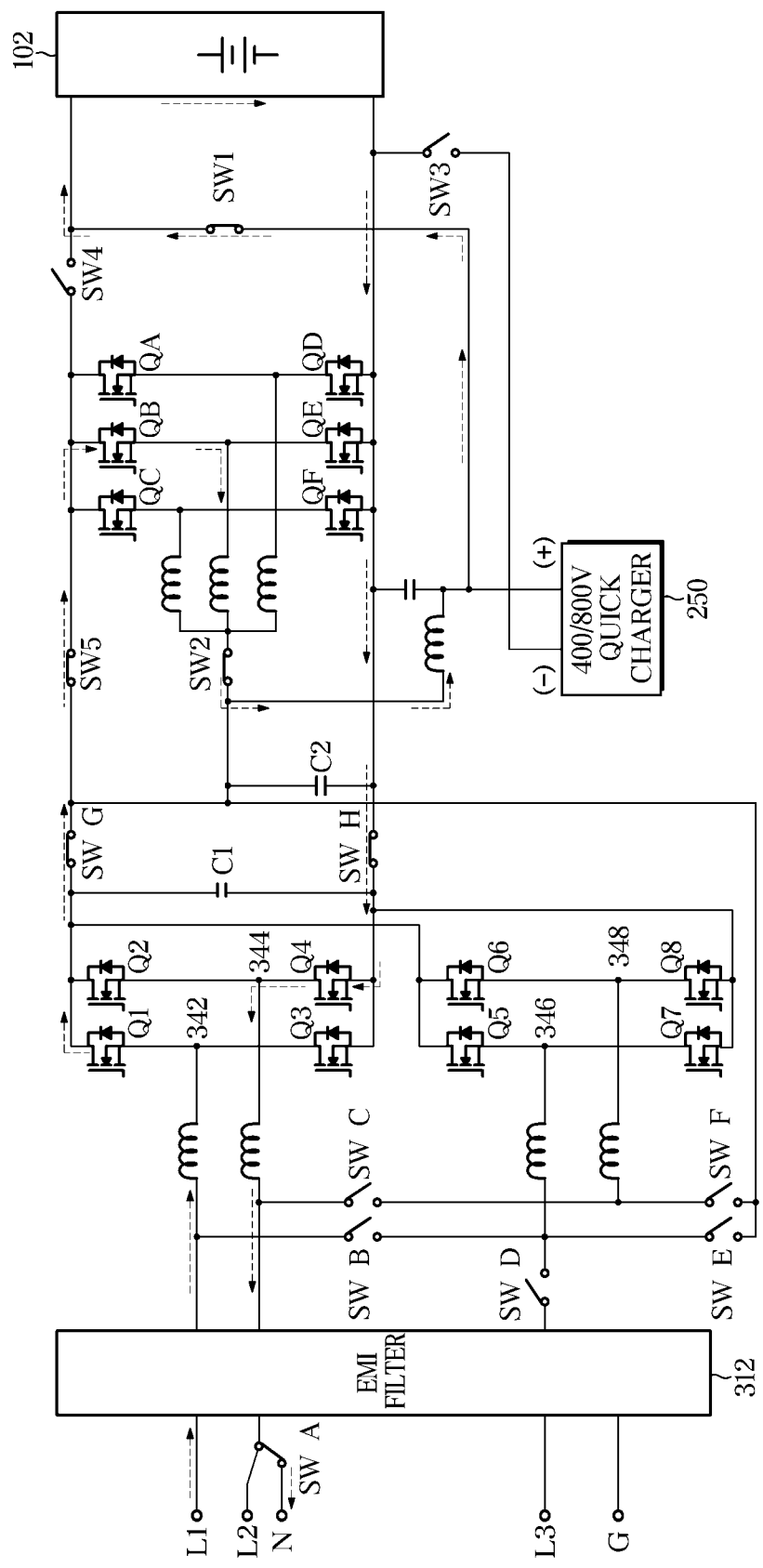
FIG. 12 is a diagram illustrating an on/off combination of a switch network corresponding to a three-phase high voltage power supply.

FIG. 12 is a diagram illustrating a case where a high voltage battery 102 is charged by receiving power from a three-phase high voltage power source.

Figure 13:
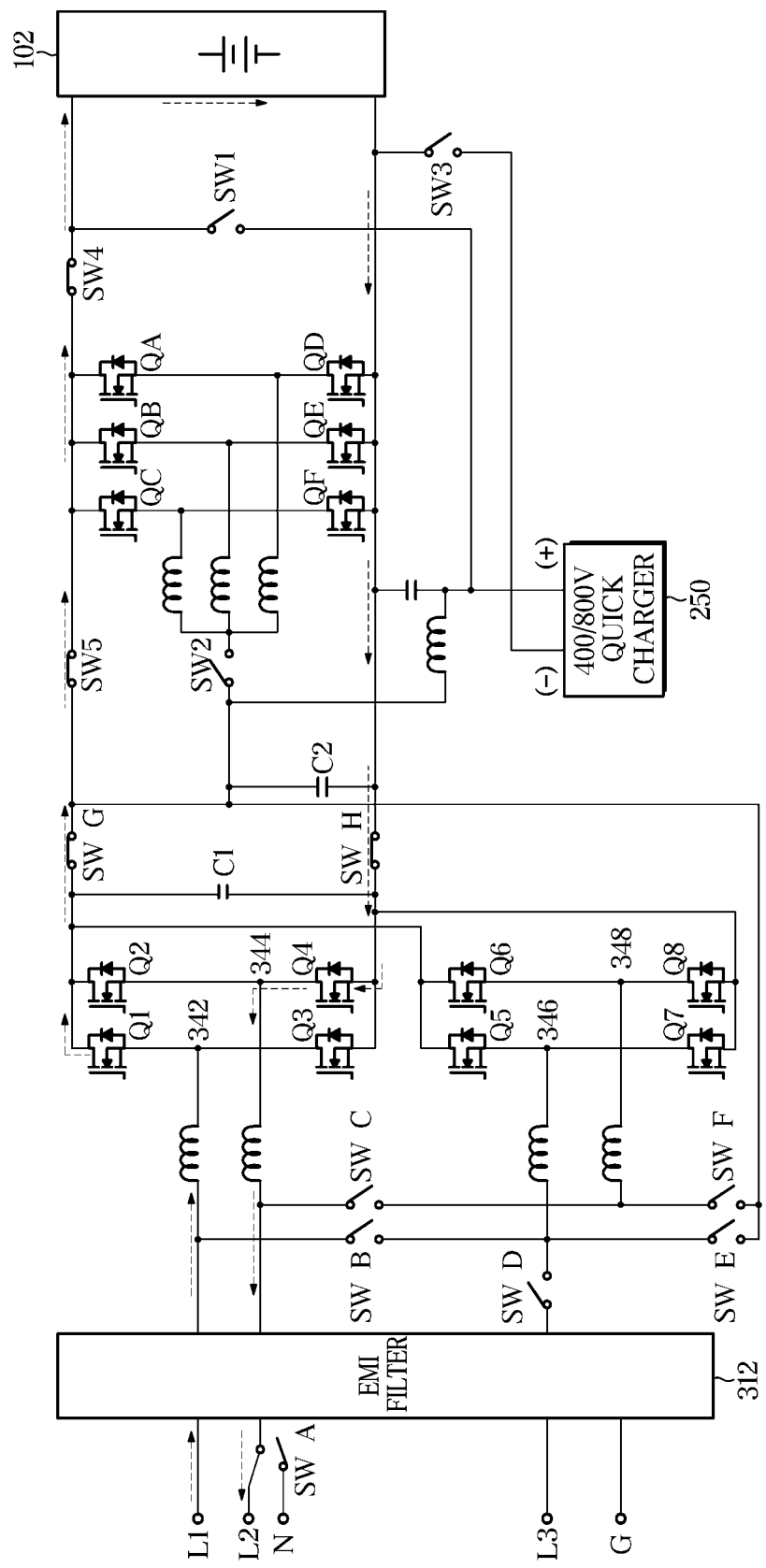
FIG. 13 is a diagram illustrating an on/off combination of a switch network corresponding to a single phase intermediate voltage power supply.

FIG. 13 is a diagram illustrating a case where a high voltage battery 102 is charged by receiving power from a single-phase intermediate voltage power source.

FIGS. 5 to 13 will be described in detail as follows.

FIG. 5 is a diagram illustrating an on/off combination of a switch network for responding to a single-phase power source in North America. In particular, FIG. 5 is a diagram illustrating control of a switch network for responding to a single-phase power supply of 240 Vrms and a battery charging voltage of 350 to 850 V, for example.

In the case of FIG. 5, the on/off combination of each switch constituting the switch network is as follows.

SW 1: OFF, SW 2: OFF, SW 3: OFF, SW 4: ON, SW 5: ON

SW A: ON, SW B: ON, SW C: ON or OFF, SW D: OFF, SW E: OFF, SW F: ON or OFF, SW G: ON, SW H: ON

The switch SW A is turned on such that the neutral wire N is connected to the EMI filter 312. Thus, 240 Vrms of single-phase AC power in North America may be input through the AC power input line L1 and the neutral line N.

In this case, the switches SW 1, SW 2, SW 3, SW D, SW E are turned off and the remaining switches SW 4, SW 5, SW A, SW B, SW G, SW H is turned on. In the case of FIG. 5, the switch SW C and the switch CW F may be in any state of turn on or turn off.

By the on/off combination of the switch network, a current is applied through the first full bridge circuit and the second full bridge circuit along the path indicated by the dotted arrow in FIG. 5 to charge the high voltage battery 102. In this case, the current is directly transferred to the high voltage battery 102 without passing through the coils of the motor 212 and the switching elements QA, QB, QC, QD, QE and QF of the inverter 206 (BYPASS).

Through the on/off combination of the switch network, the full-bridge inverter type boost power factor corrector is implemented in the on-board charger 202 to cope with single-phase AC power in North America.

FIG. 6 is a diagram illustrating an on/off combination of a switch network corresponding to a single-phase power source in North America. In particular, FIG. 6 is a diagram illustrating control of a switch network for responding to a single-phase power supply of 120 Vrms and a battery charging voltage of 350 to 550 V and 550 to 850 V, for example.

In the case of FIG. 6, on/off combinations of the switches constituting the switch network are as follows.

SW 1: OFF, SW 2: ON, SW 3: OFF, SW 4: ON, SW 5: OFF

SW A: ON, SW B: OFF, SW C: OFF, SW D: OFF, SW E: OFF, SW F: OFF, SW G: ON, SW H: ON

The switch SW A is turned on such that the neutral wire N is connected to the EMI filter 312. As a result, 120 Vrms single-phase AC power in North America may be input through the AC power input line L1 and the neutral line N. In this case, the switches SW 1, SW 3, SW 5, SW B, SW C, SW D, SW E, SW F are turned off and the remaining switches SW 2, SW 4, SW A, SW G, SW H is turned on.

By the on/off combination of the switch network, a current is applied through the first full bridge circuit along the path indicated by the dotted arrow in FIG. 6 to charge the high voltage battery 102. When the battery charge voltage is 550 to 850 V, as shown in FIG. 6, the boost circuit is configured in the motor 212 and the inverter 206 so that current is transferred to the coil of the motor 212 and the switching element QB of the inverter 206 and the current is delivered to the high voltage battery 102. However, if the battery charge voltage is 350~550V, current does not pass through the coil of the motor 212 and the switching elements QA, QB, QC, QD, QE, QF of the inverter 206 and is directly delivered to the high voltage battery 102 (bypass).

FIG. 7A and FIG. 7B are a diagram illustrating an on/off combination of a switch network corresponding to a single-phase power supplies in Korea and Europe. FIG. 7A is a diagram illustrating control of a switch network for responding to a 220 Vrms single-phase power supply and a battery charging voltage of 550 to 850 V. FIG. 7B is a diagram illustrating control of a switch network for responding to a 220 Vrms single phase power supply and a battery charging voltage of 350 to 550 V.

In the case of FIG. 7A, on/off combinations of the switches constituting the switch network are as follows.

SW 1: OFF, SW 2: ON, SW 3: OFF, SW 4: ON, SW 5: OFF (or ON)

SW A: ON, SW B: OFF, SW C: OFF, SW D: OFF, SW E: ON, SW F: ON, SW G: OFF, SW H: ON

As shown in FIG. 7A, the switch SW A is turned on such that the neutral wire N is connected to the EMI filter 312. As a result, 220 Vrms single-phase AC power in Korea and Europe may be input through the AC power input line L1 and the neutral line N. In this case, the switches SW 1, SW 3, SW 5, SW B, SW C, SW D, SW G are turned off, and the remaining switches SW 2, SW 4, SW A, SW E, SW F, SW H are turned on.

By such on/off combination of the switch network, a current is applied through the first full bridge circuit and the second full bridge circuit along the path indicated by the dashed arrow in FIG. 7A to charge the high voltage battery 102. That is, when the battery charging voltage is 550~850V, a single-phase full bridge boost converter is implemented in the on-board charger 202, so that it is possible to cope with input of single-phase AC power of 220 Vrms in Korea and Europe. In this case, the current applied to charge the high voltage battery 102 is transferred to the high voltage battery 102 through the coil of the motor 212 and the switching element QB of the inverter 206. However, when the battery charging voltage is 350~550V, the on-board charger 202 implements a single phase full bridge boost converter and a buck converter. In this case, as shown in FIG. 7B, as the switch SW 5 is turned on, a current for charging the high voltage battery 102 is directly transferred to the high voltage battery 102 by bypassing the inverter 206 and the motor 212.

FIGS. 8A and 8B are diagrams illustrating an on/off combination of a switch network corresponding to a three-phase power supplies in Korea and Europe. FIG. 8A is a diagram illustrating a control of a switch network for responding to a three-phase power supply of 380 Vrms and a battery charging voltage of 600 to 850 V. FIG. 8B is a diagram illustrating control of a switch network for responding to a three-phase power supply of 380 Vrms and a battery charging voltage of 350 to 600 V.

In the case of FIG. 8A, the on/off combination of each switch constituting the switch network is as follows.

SW 1: OFF, SW 2: ON, SW 3: OFF, SW 4: ON, SW 5: OFF (or ON)

SW A: OFF, SW B: OFF, SW C: OFF, SW D: ON, SW E: OFF, SW F: ON, SW G: OFF, SW H: OFF

As shown in FIG. 8A, the switch SW A is turned off so that the neutral wire N is not connected to the EMI filter 312. Thus, three-phase AC power of 380 Vrms in Europe can be input through the AC power input lines L1, L2, and L3. In this case, the switches SW 1, SW 3, SW 5, SW A, SW B, SW C, SW E, SW G, SW H are turned off and the remaining switches SW 2, SW 4, SW D, SW F are turned on.

By the on/off combination of the switch network, a current is applied through the first full bridge circuit and the second full bridge circuit along the path indicated by the dotted arrow in FIG. 8 to charge the high voltage battery 102. That is, when the battery charging voltage is 600~850V single-phase full-bridge boost converter is implemented in the on-board charger 202, it is possible to cope with the input of single-phase AC power of 380 Vrms in Korea and Europe. In this case, the current applied to charge the high voltage battery 102 is transferred to the high voltage battery 102 through the coil of the motor 212 and the switching element QB of the inverter 206. However, when the battery charging voltage is 350~550V, the on-board charger 202 implements a single phase full bridge boost converter and a buck converter. In this case, as shown in FIG. 7B, as the switch SW 5 is turned on, a current for charging the high voltage battery 102 is directly transferred to the high voltage battery 102 by bypassing the inverter 206 and the motor 212.

FIG. 9 is a diagram illustrating an on/off combination of a switch network corresponding to a quick charger. In particular, FIG. 9 is a diagram illustrating control of a switch network for responding to a DC power supply of 200 to 500 V and a battery charging voltage of 500 to 850 V, for example.

In the case of FIG. 9, the on/off combination of each switch constituting the switch network is as follows.

SW 1: OFF, SW 2: ON, SW 3: ON SW 4: ON SW 5: OFF

SW A: OFF, SW B: OFF, SW C: OFF, SW D: OFF, SW E: OFF, SW F: OFF, SW G: OFF, SW H: OFF

That is, in the case of FIG. 9, only switches SW 2, SW 3 and SW 4 are turned on, and the remaining switches SW 1, SW 5, (SW A) (SW B) (SW C) (SW D). (SW E) (SW F) (SW G) (SW H) are all turned off. By the on/off combination of the switch network, a current is applied through the motor 212 and the inverter 206 along the path indicated by the dotted arrow in FIG. 9 to charge the high voltage battery 102. That is, when fast charging is performed by receiving a DC current as shown in FIG. 9, the high voltage battery 102 is charged through the motor 212 and the inverter 206 in the quick charger 250 without passing through the on-board charger 202. As such, when the battery charging voltage is 500~850V, the boost circuit is configured in the motor 212 and the inverter 206, the DC power supplied from the quick charger 250 charges the high voltage battery 102 through the switch SW 2 (SW 3) and the switching element QB of the inverter 206 that are turned on.

FIG. 10 is a diagram illustrating an on/off combination of a switch network corresponding to a quick charger. In particular, FIG. 10 is a diagram illustrating control of a switch network for responding to a DC power supply of 800 V and a battery charging voltage of 500 to 850 V, for example.

In the case of FIG. 10, the on/off combination of each switch constituting the switch network is as follows.

SW 1: ON, SW 2: OFF, SW 3: ON, SW 4: OFF, SW 5: OFF

SW A: OFF, SW B: OFF, SW C: OFF, SW D: OFF, SW E: OFF, SW F: OFF, SW G: OFF, SW H: OFF

That is, in the case of FIG. 10, only the switches SW 1 and SW 3 are turned on, and the remaining switches SW 2, SW 4, SW 5, SW A, SW B, SW C, and SW D, SW E, SW F, SW G, SW H are all turned off. By the on/off combination of the switch network, a current is directly applied from the quick charger 250 to the high voltage battery 102 along the path indicated by the dotted arrow in FIG. 10 to charge the high voltage battery 102. That is, when the battery charging voltage is 500~850V, the high voltage battery 102 is directly charged from the quick charger 250 without passing through the on-board charger 202, the motor 212, and the inverter 206.

FIG. 11 is a diagram illustrating an on/off combination of a switch network corresponding to a single-phase low voltage power supply. In particular, FIG. 11 is a diagram illustrating control of a switch network for responding to a single-phase low voltage AC power supply of 110 V, for example.

In the case of FIG. 11, the on/off combination of each switch constituting the switch network is as follows.

SW 1: OFF, SW 2: ON, SW 3: OFF, SW 4: ON, SW 5: OFF

SW A: ON, SW B: OFF, SW C: OFF, SW D: OFF, SW E: OFF, SW F: OFF, SW G: ON, SW H: ON

Since the switch SW A is turned on, the neutral wire N is connected to the EMI filter 312. Accordingly, a low voltage single phase AC power of 110V may be input through the AC power input line L1. In this case, the switches SW 1, SW 3, SW 5, SW B, SW C, SW D, SW E, SW F, are turned off, and the remaining switches SW 2, SW 4, SW A, SW G, SW H are turned on.

By the on/off combination of such a switch network, a current is applied through the first full bridge circuit, the motor 212, and the inverter 206 along the path indicated by the dotted arrow in FIG. 11 to charge the high voltage battery 102.

Through the on/off combination of the switch network, the full-bridge inverter type boost power factor corrector is implemented in the on-board charger 202, and by implementing the boost converter in the motor 212 and the inverter 206, it is possible to cope with a low voltage single-phase AC power supply of 110V.

FIG. 12 is a diagram illustrating an on/off combination of a switch network corresponding to a three-phase high voltage power supply. In particular, FIG. 12 is a diagram illustrating control of a switch network for responding to, for example, a three-phase high voltage AC power supply of 380V.

In the case of FIG. 12, the on/off combination of each switch constituting the switch network is as follows.

SW 1: ON, SW 2: ON, SW 3: OFF, SW 4: OFF, SW 5: ON

SW A: ON, SW B: OFF, SW C: OFF, SW D: OFF, SW E: OFF, SW F: OFF, SW G: ON, SW H: ON

Since the switch SW A is turned on, the neutral wire N is connected to the EMI filter 312. Thus, a high voltage single phase AC power of 380V may be input through the AC power input line L1 In this case, the switches SW 3, SW 4, SW A, SW B, SW C, SW D, SW E, SW F are turned off and the remaining switches SW 1, SW 2, SW 5, SW A, SW G, SW H is turned on.

By the on/off combination of such a switch network, a current is applied through the first full bridge circuit, the motor 212, and the inverter 206 along the path indicated by the dotted arrow in FIG. 12 to charge the high voltage battery 102.

Through the on/off combination of the switch network, the full-bridge inverter type boost power factor corrector is implemented in the on-board charger 202, the buck converter is implemented in the motor 212 and the inverter 206 to cope with a high voltage three-phase AC power supply of 380V.

FIG. 13 is a diagram illustrating an on/off combination of a switch network corresponding to a single phase intermediate voltage power supply. In particular, FIG. 13 is a diagram illustrating control of a switch network for responding to, for example, a single-phase intermediate voltage AC power supply between 110V and 380V.

In the case of FIG. 13, on/off combinations of the switches constituting the switch network are as follows.

SW 1: OFF, SW 2: OFF, SW 3: OFF, SW 4: ON, SW 5: ON

SW A: OFF, SW B: OFF, SW C: OFF, SW D: OFF, SW E: OFF, SW F: OFF, SW G: ON, SW H: ON

Since the switch SW A is turned off, the neutral wire N is not connected to the EMI filter 312. As a result, an intermediate voltage single phase AC power between 110V and 380V may be input through the AC power input lines L1 and L2. In this case, the switches SW 1, SW 2, SW 3, SW A, SW B, SW C, SW D, SW E, SW F are turned off and the remaining switches SW 4, SW 5, SW G, SW H are turned on.

By the on/off combination of the switch network, a current is applied through the first full bridge circuit along the path indicated by the dotted arrow in FIG. 13 to charge the high voltage battery 102. In this case, current does not flow to the motor 212 and the inverter 206.

Through the on/off combination of the switch network, the full-bridge inverter type boost power factor correcting unit is implemented in the on-board charger 202 to correspond to an intermediate voltage single phase AC power supply between 110V and 380V.

The above description is merely illustrative of the technical idea, and various modifications, changes, and substitutions may be made by those skilled in the art without departing from the essential characteristics. Therefore, the embodiments and the accompanying drawings disclosed above are not intended to limit the technical spirit, but to describe, and the scope of the technical spirit is not limited by the embodiments and the accompanying drawings. The scope of protection shall be interpreted by the following claims, and all technical ideas within the scope of equivalent shall be interpreted as being included in the scope of rights.

According to the battery charger for electric vehicle, there is provided a charger of an electric vehicle having a simple structure, small size, and capable of charging a battery with power supplied from various types of power sources.

The invention claimed is:

1. A battery charger for electric vehicle comprising:
   a motor configured to generate power for driving the electric vehicle;
   an inverter configured to provide the power to the motor;
   an AC power input terminal configured to be input at least one AC power input of single phase AC power and polyphaser AC power from a slow charger;
   a power factor corrector configured to include a plurality of full bridge circuits through which the AC power is input through the AC power input terminal;
   a link capacitor configured to connect in parallel with the power factor corrector;
   a switch network configured to include a first switch SW A provided to connect any one of a plurality of AC power input lines and a neutral line constituting the AC power input terminal with the power factor corrector, and a second switch provided to transfer one of a DC power input from a quick charger and the AC power input from the slow charger to a high voltage battery; and
   a controller configured to control the power factor corrector and the switch network according to the conditions of the AC power and the DC power, wherein
   the second switch includes:
   an eighth switch SW 5 connected between one side of each of the plurality of full bridge circuits and one side of the inverter;

an eleventh switch SW 4 provided between one side of the inverter and the positive electrode of the high voltage battery;

a twelfth switch SW 1 provided to connect between the positive electrode of the quick charger and the positive electrode of the high voltage battery;

a thirteenth switch SW 3 provided to connect between the negative electrode of the quick charger and the negative electrode of the high voltage battery; and a fourteenth switch SW 2 provided to connect the positive electrode of the high voltage battery through the twelfth switch SW 1 and the positive electrode of the quick charger to the neutral point of the motor.

2. The battery charger according to claim 1, wherein the plurality of full bridge circuits includes a first full bridge circuit and a second full bridge circuit.

3. The battery charger according to claim 2, wherein a first leg of the first full bridge circuit is connected to a first AC power input line of the AC power input terminal; and a second leg of the first full bridge circuit is selectively connected to any one of the neutral line and the second AC power input line of the AC power input terminal through the first switch SW A.

4. The battery charger according to claim 3, wherein the second switch includes:

a third switch SW B connected between the first leg of the first full bridge circuit and a first leg of the second full bridge circuit;

a fourth switch SW C connected between the second leg of the first full bridge circuit and a second leg of the second full bridge circuit;

a fifth switch SW D connected a node to which the first leg of the second full bridge circuit and the third switch SW B are connected to a third input terminal of the AC power input terminal.

5. The battery charger according to claim 4, wherein the second switch further includes;

a sixth switch SW G having one end connected to a positive electrode of the link capacitor;

a seventh switch SW H having one end connected to a negative electrode of the link capacitor, wherein the battery charger is connected to the negative electrode of the link capacitor and the other side of the inverter through the seventh switch SW H.

6. The battery charger according to claim 5, wherein the second switch further includes a tenth switch SW F connecting the node connected to the second leg of the second full bridge circuit and the fourth switch SW C to the other end of the sixth switch SW G.

7. The battery charger according to claim 1, wherein the condition of the input AC power includes the conditions of polyphaser and single phase of the input AC power.

8. The battery charger according to claim 1, wherein the condition of the input AC power includes a symmetrical and asymmetrical power supply condition of the input AC power.

* * * * *